United States Patent [19]
Kato et al.

[11] Patent Number: 5,410,097
[45] Date of Patent: Apr. 25, 1995

[54] KARAOKE APPARATUS WITH SKIP AND REPEAT OPERATION OF ORCHESTRA ACCOMPANIMENT

[75] Inventors: Hirokazu Kato; Youji Semba, both of Hamamatsu, Japan

[73] Assignee: Yamaha Corporation, Japan

[21] Appl. No.: 132,819

[22] Filed: Oct. 6, 1993

[30] Foreign Application Priority Data

Oct. 9, 1992 [JP] Japan ................. 4-297795

[51] Int. Cl.⁶ .................. G10H 1/02; G10H 1/36
[52] U.S. Cl. ................................ 84/610; 84/631; 84/634; 84/477 R; 84/DIG. 4
[58] Field of Search .................. 84/601, 602, 609–614, 84/631, 634–638, 477 R, 478, DIG. 4, DIG. 6

[56] References Cited
U.S. PATENT DOCUMENTS 5,239,124  8/1993  Eitaki et al. .................. 84/634

*Primary Examiner*—Stanley J. Witkowski
*Attorney, Agent, or Firm*—Graham & James

[57] ABSTRACT

In a Karaoke apparatus, a sound synthesizer reproduces an instrumental accompaniment of a song requested by a singer during the course of a vocal performance of the song by the singer. A whole of the instrumental accompaniment is provisionally divided into a plurality of blocks each having a start address and an end address. A detector successively detects start and end addresses of each block with progression of the reproduction of the instrumental accompaniment. A skip command is inputted by a skip switch when a certain block is being reproduced. A controller responds to the detector and the skip switch, and operates when an end address of said certain block is detected for controlling the sound synthesizer to skip an immediately succeeding block to thereby continue to a start address of a further succeeding block during the course of the reproduction of the instrumental accompaniment. Further, a repeat command may be inputted by a repeat switch so as to effect repeat reproduction of a certain block.

12 Claims, 10 Drawing Sheets

FIG. 3

| Track | | | | | | | | | |
|---|---|---|---|---|---|---|---|---|---|
| TK1 | Accompaniment information | Δt | Accompaniment information | Δt | Accompaniment information | Δt | Accompaniment information | Δt | Accompaniment information |
| TK2 | Picture information | Δt | Picture information | Δt | Picture information | Δt | Picture information | Δt | Picture information |
| TK3 | Measure information | Δt | Measure information | Δt | |  | | | |
| TK4 | Word information | Δt | Word information | Δt | | | | | |
| TK5 | Color information | Δt | Color information | Δt | Color information | Δt | Color information | Δt | Color information |

KARAOKE APPARATUS WITH SKIP AND REPEAT OPERATION OF ORCHESTRA ACCOMPANIMENT

BACKGROUND OF THE INVENTION

The present invention relates to a Karaoke apparatus, and more particularly to those provided with a tone generator in the form of a musical sound synthesizer operative according to registered accompaniment information to automatically sound an instrumental or "empty orchestra" ("Karaoke" in Japanese) accompaniment during a physical vocal performance of a requested song by a singer.

Recently, the karaoke apparatus is widely popularized. The Karaoke apparatus is equipped with an audio medium such as a magnetic tape or an optical disc for recording an instrumental accompaniment part of a popular song except for a vocal performance part. The singer physically performs the vocal part, while the instrumental accompaniment part is being reproduced. A regular type of the Karaoke apparatus is installed with a mixer which mixes a physical singing voice picked up by a microphone with the Karaoke accompaniment together with a reverberation effect or else, thereby enjoying an interesting song performance. Further, an advanced type of the Karaoke apparatus utilizes a video medium such as an optical disc for displaying word information of the song as well as associated image information, in addition to the audio reproduction of the instrumental accompaniment. Such a Karaoke apparatus is more and more sophisticated in various aspects such as structure of the installed tone generator, manner by which word information is provided, and arrangement of peripheral equipments under divergent environment in amusement of the Karaoke performance.

Recently, one of the most advanced Karaoke apparatus is installed with a sophisticated tone generator, i.e., a musical sound synthesizer which is generally adopted in an electronic musical instrument or a computer music box. While the tone generator is driven according to registered accompaniment information of the instrumental accompaniment, a display device is driven concurrently according to registered word information to visually indicate song words in the form of a sequence of characters in synchronization with the automatic instrumental accompaniment. In contrast to the regular Karaoke apparatus, the most advanced Karaoke apparatus utilizes simplified accompaniment information like a text data of a musical score rather than audio information based on sampled analog waves, thereby saving a data amount and facilitating transfer and copy of the registered accompaniment information.

Generally, the conventional Karaoke apparatus is constructed such that the orchestra accompaniment of the song is continuously reproduced in straight manner from a top to a last end of the song. Therefore, the singer can select only either of a complete mode where the orchestra accompaniment is continued to the last end once the same is started, or a break mode where the continuing orchestra accompaniment is forcibly stopped to terminate the same. The same is true with respect to the most advanced Karaoke apparatus in which the musical sound synthesizer is driven according to the registered accompaniment information, while the display device is driven concurrently according to the registered word informal ion to visually indicate the song words in synchronization with the automatic accompaniment.

However, it will be desired for better enjoyment of the Karaoke performance to achieve irregular or unusual operation such as to skip a part of the Karaoke song during the course of the automatic accompaniment to thereby shorten the entire length of the song or such as to repeat, a part of the Karaoke song. Such a special operation may attract new users of the Karaoke apparatus. Compaction of the song performance by the skip operation is frequently adopted, for example, in a commercial television program for shortening a time schedule. Therefore, the user may desire such a compaction operation of the song performance even in the Karaoke apparatus for enhancing the amusement of the Karaoke play. Further, the repeat operation of the Karaoke accompaniment may be suitable for practicing a vocal performance of a hard song.

SUMMARY OF THE INVENTION

In view of the above noted desire, an object of the invention is to achieve the irregular or unusual operation of the Karaoke apparatus to realize a flexible Karaoke accompaniment according to a command by the singer.

According to a first aspect of the invention, the Karaoke apparatus comprises sound means for reproducing an instrumental accompaniment of a requested song during the course of a vocal performance of the song by a singer, block means for provisionally dividing a whole of the instrumental accompaniment, into a plurality of blocks each having a start address and an end address detection means for successively detecting start and end addresses of each block with progression of the reproduction of the instrumental accompaniment, skip command means for inputting a skip command when a certain block is being reproduced, and control means responsive to the detection means and the skip command means and operative when an end address of said certain block is detected for controlling the sound means to skip an immediately succeeding block to thereby continue to a start address of a further succeeding block during the course of the reproduction of the instrumental accompaniment.

According to a second aspect of the invention, the Karaoke apparatus comprises sound means for reproducing an instrumental accompaniment of a requested song during the course of a vocal performance of the song by a singer, block means for provisionally dividing a whole of the instrumental accompaniment into a plurality of blocks each having a start address and an end address, detection means for successively detecting start, and end addresses of each block with progression of the reproduction of the instrumental accompaniment, repeat command means for inputting a repeat command when a certain block is being reproduced and control means responsive to the detection means and the repeat command means and operative when an end address of said certain block is detected for controlling the sound means to return to a start address of said certain block to thereby repeat said certain block during the course of the reproduction of the instrumental accompaniment.

BRIEF DESCRIPTION OF THE DRAWINGS

FIG. 3 is a format diagram illustrating a performance data area which is a main part of the song text data.

DETAILED DESCRIPTION OF THE INVENTION

Figure 1:
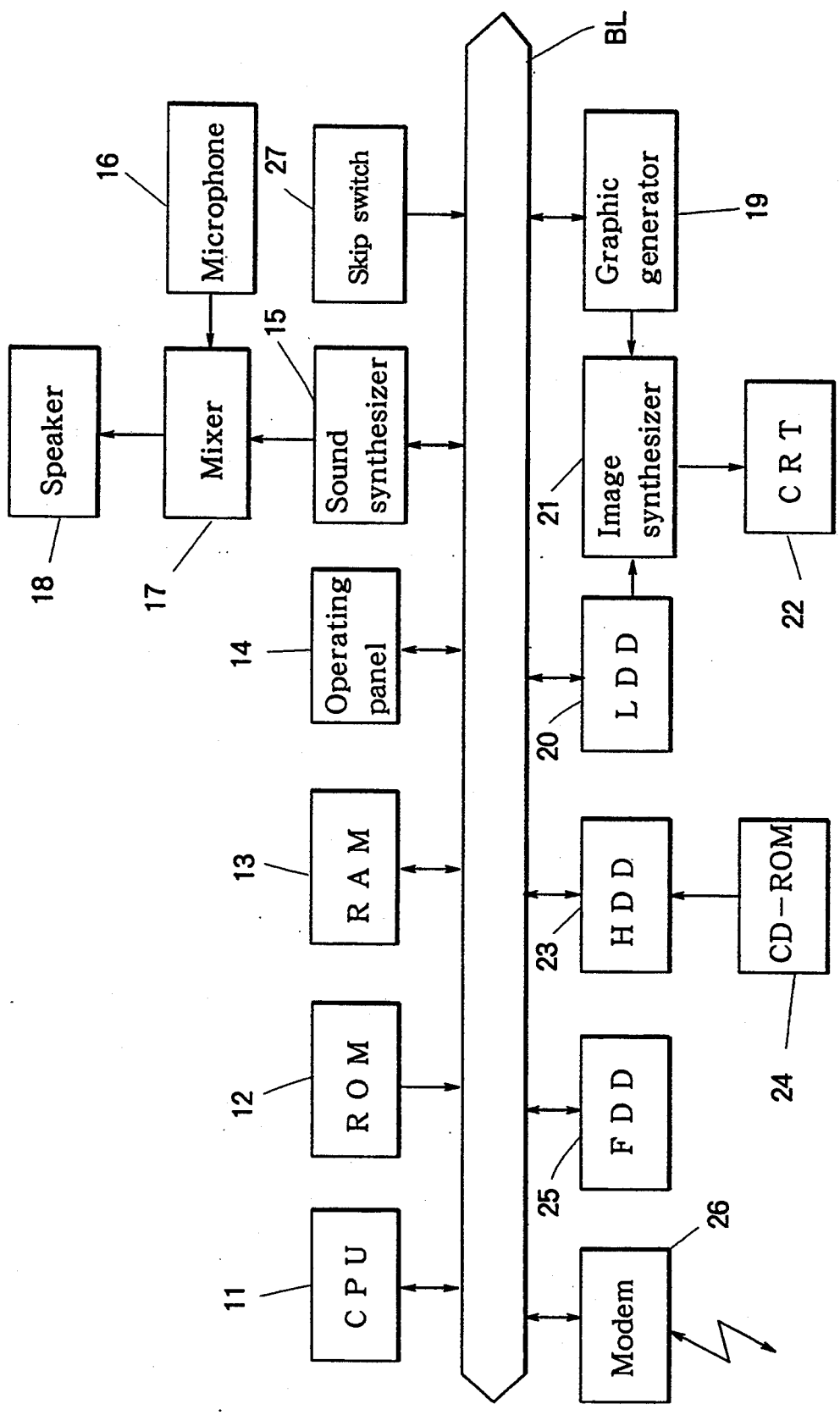
FIG. 1 is a schematic block diagram showing a first embodiment of the inventive Karaoke apparatus.

Hereinafter, preferred embodiments of the invention will be described in conjunction with the drawings. FIG. 1 schematically shows a first embodiment of the inventive Karaoke apparatus. In this embodiment, when a skip switch is operated, a certain block is skipped during the course of Karaoke performance to thereby realize a skip orchestra accompaniment.

The Karaoke apparatus of FIG. 1 is comprised of a central processing unit (CPU) 11, a read-only memory (ROM) 12, a random access memory (RAM) 13, an operating panel 14, a musical sound synthesizer 15, a microphone 16, a mixer 17, a speaker 18, a graphic generator 19 in the form of a computer graphic unit, a laser disc unit (LDD) 20, an image synthesizer 21, a display unit 22 such as a CRT, a hard disc unit (HDD) 23, a compact disc ROM unit (CD-ROM) 24, a floppy disc unit (FDD) 25, a modem 26 and a skip switch 27. The LDD 20 can deal with various optical discs such as Laser Disc (trademark) and other medium recorded with CD Graphics or digital motion picture. In this embodiment, the modem 26 is utilized for an interface of a communication network. A common bus line BL is provided to connect altogether those of CPU 11, ROM 12, RAM 13, operating panel 14, musical sound synthesizer 15, graphic generator 19, LDD 20, HDD 23, FDD 25, a modem 26 and a skip switch 27.

The CPU 11 controls and manages entire operation of the Karaoke apparatus. The ROM 12 is written with an operation program including a performance control program which is used for reproducing orchestra accompaniment, and which contains a specific program for effecting skip operation. The skip operation is commenced in response to a given skip command such that a certain block of the song is skipped irregularly during the continuous progression of the orchestra accompaniment. In the skip operation, the block is defined in terms of a relatively long period such as a chorus, a verse, a refrain and a bridge.

The RAM 13 is used when the CPU 11 controls and manages the operation of the Karaoke apparatus. The operation program stored in the ROM 12 is loaded into the RAM 13 by the control of the CPU 11 when the Karaoke apparatus is turned on. The operating panel 14 contains various manual pieces such as switches and knobs for operating the Karaoke apparatus.

The musical sound synthesizer 15 is driven according to accompaniment information to generate a musical sound signal of the instrumental accompaniment part. The synthesizer 15 is provided with a tone generator such as an MIDI tone generator and a controller for controlling the tone generator. The microphone 16 is used for picking up a voice of the performer who is singing accompanied by the Karaoke apparatus. The mixer 17 mixes an output of the musical sound synthesizer 15 and another output of the microphone 16 with each other. The mixer 17 is provided with an echo device or reverberation device, if desired, for adding reverberation effect to the output, of the microphone 16. The speaker 18 is driven by an out, put of the mixer 17 to sound a complete song performance which is the mixture of the instrumental accompaniment part from the musical sound synthesizer 15 and the physical vocal part from the microphone 16.

The graphic generator 19 processes word information representative of words of a requested song and direct picture information representative of a still image or a moving image, those of which are registered together with the accompaniment information, to thereby generate a graphic signal for the display unit 22. The LDD 20 is actuated when the performer requests a particular song which is specified to use image information recorded in an installed laser disc. The LDD 20 is accessed according to indirect picture information in synchronization with the accompaniment information to reproduce image information such as a given still image of a specified frame in a specified laser disc or a given moving image which starts from a specified frame in a specified laser disc. For this, the LDD 20 is preferably provided with auto-selecting function of plural laser discs. The image synthesizer 21 combines an output of the graphic generator 19 and another output of the LDD 20 with one another to synthesize a composite image signal. The display unit 22 such as CRT visually reproduces the composite image formed by the image synthesizer 21.

The hard disc unit 23 is stored with a text, data of each Karaoke song, such as a song name, a singer name, a release date, key words, accompaniment information, picture information, measure information, and word information. The operating panel 14 is actuated to select a requested song. The CPU 11 operates to load the text, data of the selected song into the RAM 13. Then, the RAM 13 is addressed by the CPU 11 to read out the loaded or registered text data including the accompaniment information and the word information, which are separately fed to the musical sound synthesizer 15 and to the graphic generator 19, thereby effecting a Karaoke performance of multi-medium. The CD-ROM unit 24 is utilized to read out a source text data of each song stored in a memory medium of a CD-ROM to down-load the same into the hard disc unit 23.

The floppy disc unit 25 is provided for recording and reproduction of the text data such as to write a certain text. data of the hard disc unit 23 into a floppy disc, or such as to read out a text data from a floppy disc to down-load the same into the hard disc unit 23. The floppy disc is utilized to transfer the text data among Karaoke apparatuses. The modem 26 is utilized to connect one Karaoke apparatus to another Karaoke apparatus or to a host system through a communication channel such as to transmit and receive a text data or other performance data.

The skip switch 27 is manually operated to input a skip command. The skip switch 27 may be disposed on a grip of the microphone 16 separately from the main operating panel 14 for facilitating command operation by the singer during the song performance.

In the Karaoke apparatus shown in FIG. 1 the CD-ROM unit 24 is operated to provisionally down-load a text data from a CD-ROM into the hard disc unit 23, while the LDD 20 is set with an optical disc if necessary. Alternatively, the text data down-loaded in the hard disc unit 23 is initially provided from a floppy disc by means of the floppy disc unit 25, or fed from the communication channel through the modem 26.

In operation of the Karaoke apparatus shown in FIG. 1, when a power source is turned on, the operation program written in the ROM 12 is loaded into the RAM 13 to initiate the operation. The operating panel 14 is actuated so that the CPU 11 commences according to the operation program in the RAM 13, various performances such as an automatic accompaniment. The above mentioned down-loading into the hard disc unit 23 is also initiated by the actuation of the operating panel 14 upon the turn-on of a power source under the control by the CPU 11. Then, the operating panel 14 is actuated to select a desired song so that a text data of the selected song is retrieved from the hard disc unit 23, and is loaded and registered into the RAM 13. The Karaoke performance is commenced according to the retrieved text data. During the course of the Karaoke performance, the musical sound synthesizer 15 sequentially generates according to the accompaniment information contained in the song text data a musical tone signal, which is sounded by the speaker 18 through the mixer 17. Meanwhile, the graphic generator 19 operates according to the word information and the measure information contained in the song text data to generate a sequence of characters representative of the song words updated each measure with progression of the song performance. The characters are displayed on the display unit 22 by means of the image synthesizer 21.

In this operation, a sequence of the displayed characters representative of the song words are successively turned to a different color with the progression of the song performance according to color information contained in the song text data, thereby teaching the performer a successive voice timing of the displayed characters. Moreover, the graphic generator 19 operates according to direct picture information contained in the text data to generate a graphic image with the progression of the song performance. The display unit 22 is driven by the image synthesizer 21 to display the graphic image in superposed relation to the characters of the song words. Optionally in case that a selected song specifies the use of an optical disc a particular one is selected at the start of the song performance so that a designated section of the selected optical disc is reproduced according to indirect picture information contained in the text data. A reproduced image is displayed on the display unit 22 by means of the image synthesizer 21. Consequently, the performer can manage his own vocal timings according to the words visually indicated on the display unit 22.

Figure 2:
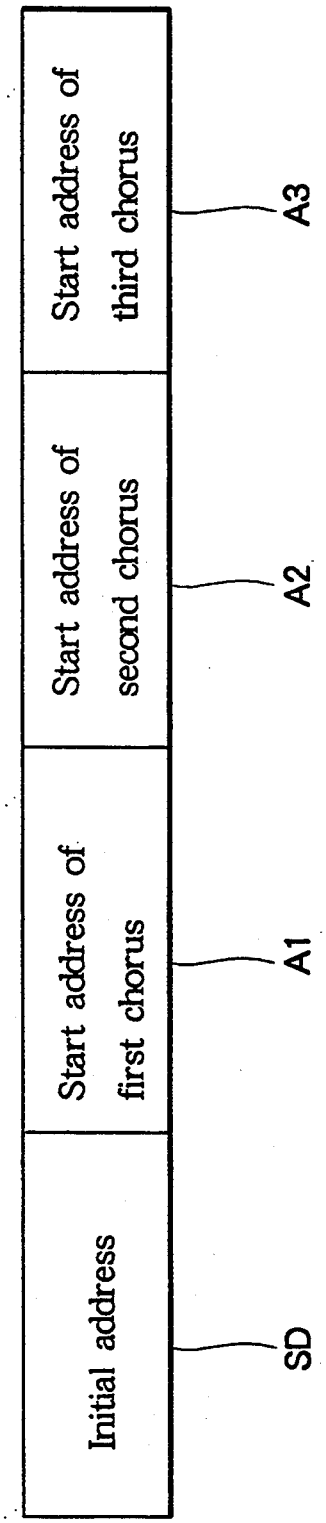
FIG. 2 is a format diagram illustrating an index data area contained in a song text data registered in the FIG. 1 embodiment.

Next, the description is given for the skip operation of the orchestra accompaniment. In this embodiment, an index data area is provided at a top of the text data format of each song which is transferred to the RAM 13 from the hard disc unit 23, and which is retrieved sequentially from the RAM 13 to effect performance. As shown in FIG. 2, in case that the selected song is composed of first, second and third choruses, the index data area is recorded with those of an initial address data SD indicative of an initial address of the song text data, a first start address data A1 of the first chorus, a second start address data A2 of the second chorus, and a third start address data A3 of the third chorus. The index data area is followed by a performance data area, which is a main part of the song text data.

The performance data is registered in a given format as shown in FIG. 3. Namely, the performance data is recorded in a plurality of parallel tracks TK1, TK2, TK3, TK4 and TK5. The first track TK1 is assigned with accompaniment information, which is provided for driving the sound synthesizer 15 to generate an accompaniment tone signal. The second track TK2 is assigned with picture information which is provided for driving the graphic generator 19 to generate a graphic image signal, and/or for driving the LDD 20 to designate an image to be reproduced from an optical disc. The third track TK3 is assigned with measure information containing an order of bars involved in a score of the song. The fourth track TK4 is assigned with word information which is provided for driving the graphic generator 19 to generate a character signal effective to visually indicate the song words. Lastly, the fifth track TK5 is assigned with color information effective to change a color tone of displayed characters with the progression of the orchestra accompaniment.

If the second track TK2 contains direct picture information, the graphic generator 19 generates a graphic signal composed of the image signal according to the direct picture information and the character signal according to the word information. The image synthesizer 21 operates to synthesize for the display unit, 22 a composite image signal composed of the graphic signal containing at least the character signal generated by the graphic generator 19, and the pure image signal produced by the LDD 20.

Those of the various information are composed of a sequence of an event, and a time interval $\Delta t$. The event represents one tone in the accompaniment information, one frame in the picture information, one bar in the measure information, and one phrase in the word information. The time interval $\Delta t$ indicates a time length between adjacent events. For example, with regard to the track TK1 of the accompaniment information, an on-event is followed by an off-event while an interval $\Delta t$ is interposed so that one tone is generated during a duration determined by the time interval $\Delta t$ between the on-event and the off-event. Though the accompaniment information is illustratively written in a single of the first track TK1, practically tile track TK1 is divided into a plurality of subtracks corresponding to different instruments involved in the orchestra accompaniment. Further, timbre information of each instrument may be included in the accompaniment information. In the FIG. 3 format, the interval is set in terms of a minimum time unit $\Delta t$ such that a desired interval length is set as a multiple of the minimum time units. Alternatively, each time interval may be set variably.

Figure 4:
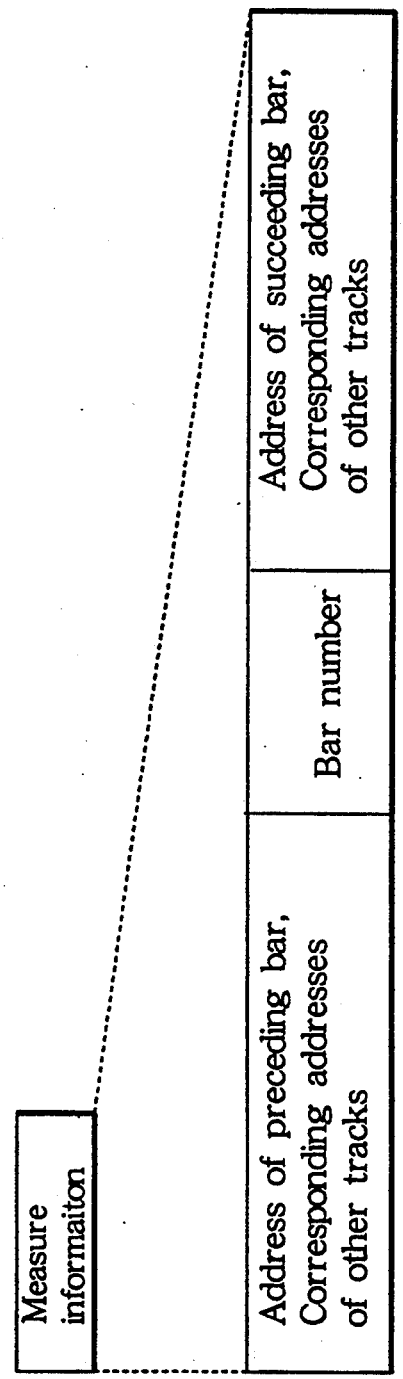
FIG. 4 is a detailed format diagram illustrating contents of measure information included in the performance data.

Further, as shown in FIG. 4, the measure information has a detailed data format containing a measure bar number as well as an address of an immediately preceding bar and corresponding address data of the remaining parallel tracks, and another address of an immediately succeeding bar and corresponding address data of the remaining parallel tracks.

When the skip switch 27 is actuated, the current block which may be a certain chorus part is terminated at the end thereof, and then the Karaoke accompaniment jumps to a second next block to continue the Karaoke accompaniment while skipping an immediately next block. In this skip operation, since the picture information is linked to the accompaniment information, the displayed image is also skipped synchronously with the sounded accompaniment so that the displayed image is automatically changed to match with the orchestra accompaniment. Consequently, the image displaying and the accompaniment sounding can be terminated concurrently with each other at the end of the song performance.

For instance, in case that the performed song is composed of three choruses, when the skip switch 27 is actuated just before the start of the song performance, the Karaoke accompaniment is started from the second chorus. When the skip switch 27 is actuated in the middle of the first chorus, the Karaoke accompaniment jumps to the third chorus after the first chorus is ended. Further, when the skip switch 27 is actuated in the middle of the second chorus, the Karaoke accompaniment returns to the first chorus after the second chorus is ended. In such a skip operation, each block is separated by a measure bar in manner similar to general accompaniment refrain or tonality transposition, thereby maintaining continuous performance in natural manner. Stated otherwise, the measure information containing the bar number or bar address is utilized to detect a start address and an end address of each block.

Figure 5:
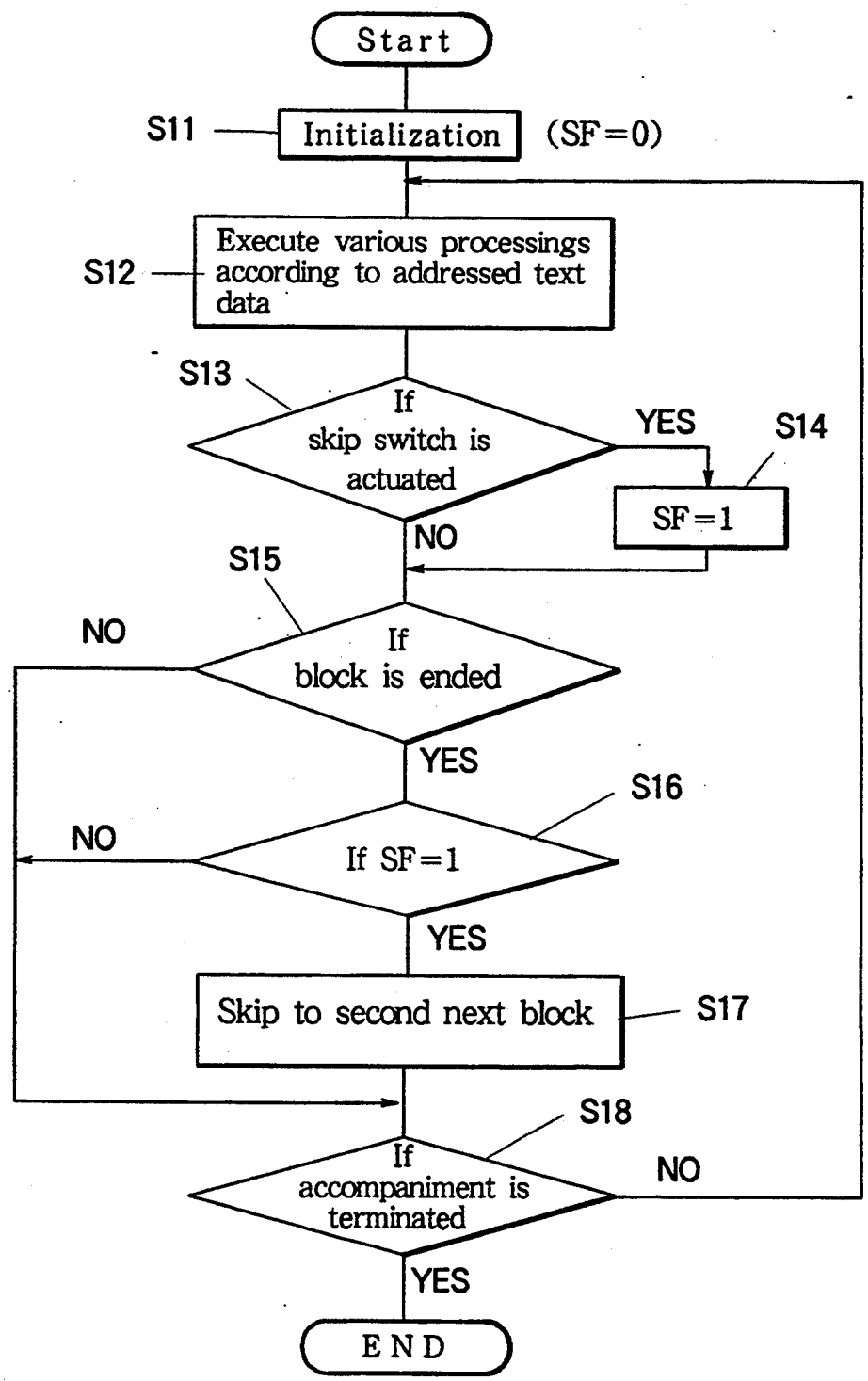
FIG. 5 is a flowchart showing skip operation in the FIG. 1 embodiment.

Next, the detailed description of the skip operation will be given with reference to a flowchart of FIG. 5. When the operating panel 14 is actuated to select a desired song, a text data of the selected song is loaded and registered into the RAM 13 from the hard disc unit 23. At first in Step S11, every part of tile Karaoke system is initialized so that a skip flag SF is also reset to "0". Then, Step S12 is undertaken to commence various processings including concurrent reproduction of the accompaniment and the picture according to the text data sequentially retrieved from the RAM 13. Next, Step S13 is undertaken to check as to if the skip switch 27 is actuated. If the check result shows YES, Step S14 is called to set the skip flag SF to "1". On the other hand, if the skip switch 27 is not actuated, the processing advances to Step S15 while the skip flag SF is maintained "0". In Step S15, detection is made as to if a current block reaches an end. If the current block is ended, Step S16 is undertaken to check as to whether SF="1". In case that SF="1" is held, Step S17 is executed to skip an immediately succeeding block to thereby continue to a further succeeding block, i.e., a second next block. Then, the skip flag SF is reset to "0". Lastly, Step S18 is undertaken to check as to if the orchestra accompaniment reaches a last end. If the check result is NO, the processing returns to Step S12 to continue the processings until the last end of the orchestra accompaniment. On the other hand, if either of the check result of Steps S15 and S16 is held negative, the processing proceeds to Step S18. Then, when the check result, of Step S18 indicates the last end, the orchestra accompaniment is terminated. Accordingly, in this first embodiment of the Karaoke apparatus, the skill switch 27 is actuated to effect skip Karaoke performance involving not, only the orchestra accompaniment but also the display of associated pictures, thereby realizing flexible and interesting Karaoke play. In modification, the size of the block for the skip operation may be defined in terms of one measure, four measures or eight measures, which is finer than that of the above described embodiment. Further, the skip performance function may be modified more flexibly such as a plurality of blocks can be skipped when the skip switch 27 is actuated twice or more in the middle of the Karaoke accompaniment, or such as the accompaniment sounding and the picture display can be terminated in fade-out manner when the skill switch 27 is actuated predetermined times or a predetermined duration, or such as the orchestra accompaniment can be jumped to an ending part thereof when the skill switch 27 is actuated in a special manner.

Figure 6:
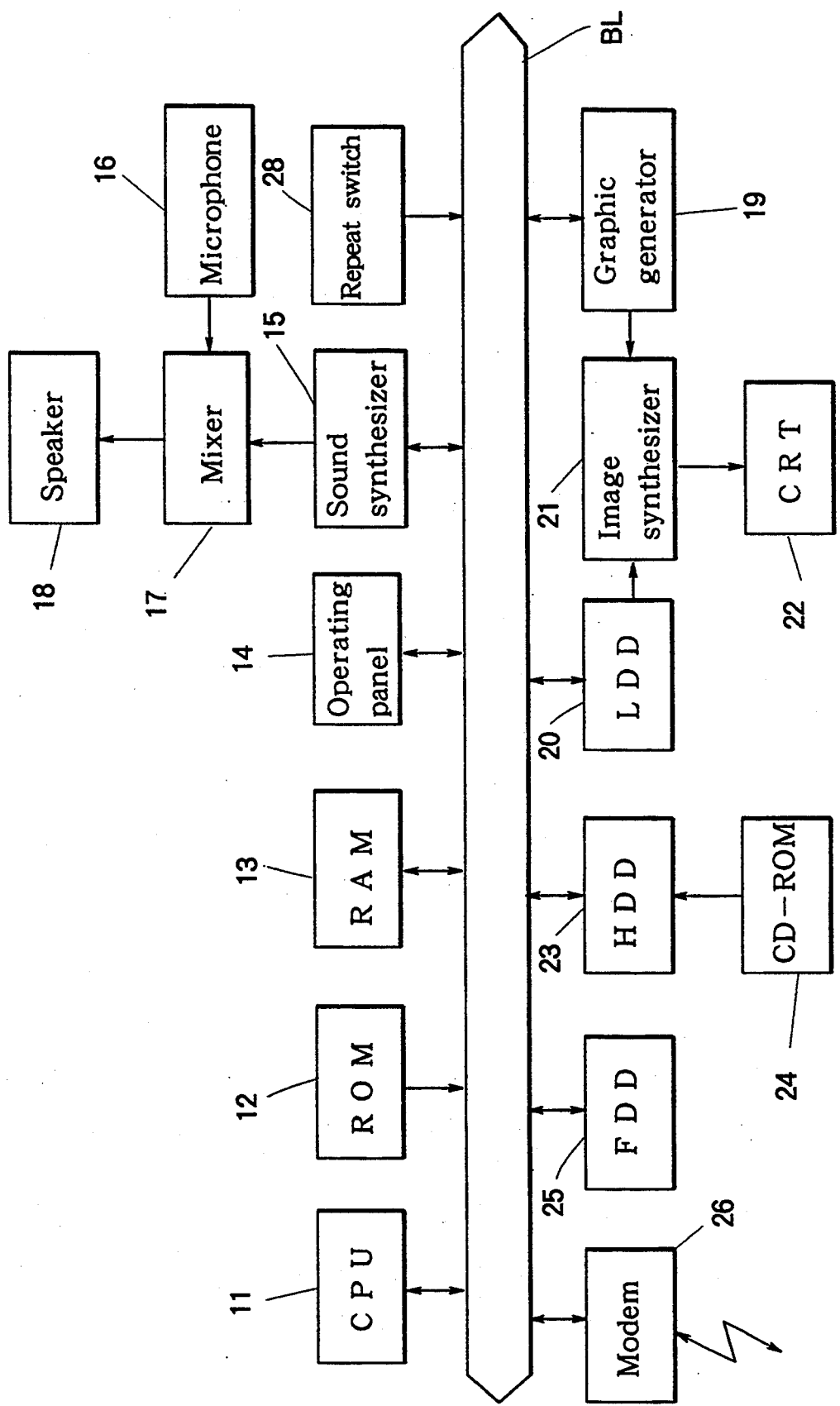
FIG. 6 is a schematic block diagram showing a second embodiment of the inventive Karaoke apparatus.

FIG. 6 schematically shows a construction of a second embodiment of the inventive Karaoke apparatus. In this embodiment, a repeat switch is actuated to repeat a certain block of the orchestra accompaniment to thereby achieve repeat operation of the Karaoke song. The seemed embodiment, of FIG. 6 is different from the first, embodiment of FIG. 1 in that a repeat switch 28 is provided in place of the skip switch 27. In this structure, the repeat switch 28 is connected to the common bus line BL together with CPU 11, ROM 12, RAM 13, operating panel 14, sound synthesizer 15, graphic generator 19, LDD 20, HDD 23, FDD 25 and modem 26. The ROM 12 is stored with a performance control program which includes a specific program for the repeat operation. The repeat operation is commenced in response to a given repeat command such that a certain block is repeated intentionally during the course of the orchestra accompaniment. The repeat block may be typically defined in terms of one measure or one phrase which is generally composed of four or eight measures. The repeat switch 28 is manually actuated at will to input a repeat command. The repeat switch 28 may be disposed on a grip of the microphone 16 for facilitating command operation by the singer during the song performance.

The repeat, operation is carried out in this embodiment as follows. If the repeat switch 28 is actuated, the orchestra accompaniment docs not advance to a next block, e.g., a next measure after the current block is ended, but the same current block is repeated. In this repeat operation, since the picture information is linked to the accompaniment information, the displayed image is repeated synchronously with the repeat of the orchestra accompaniment. Therefore, there is no discrepancy between the displaying of the image and the sounding of the accompaniment at the end of the song performance. The repeat block is also divided by a measure bar in similar manner to general accompaniment refrain or tonality transposition, thereby ensuring natural repeat operation which may be useful for practice of a hard song.

Figure 7:
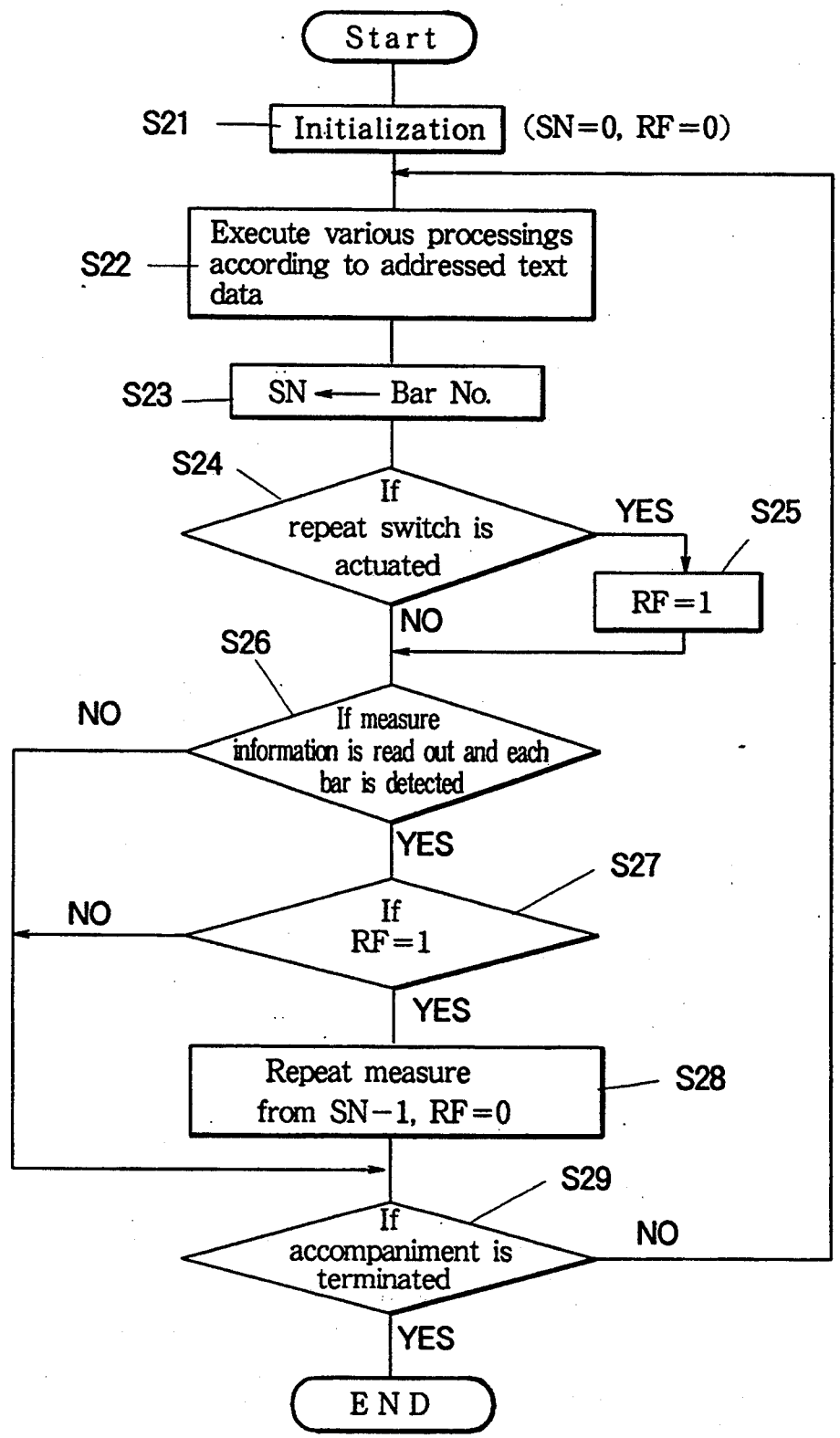
FIG. 7 is a flowchart showing repeat operation in the FIG. 6 embodiment.

Next, the detailed description is given for the repeat operation with reference to a flowchart of FIG. 7. When the operating panel 14 is actuated to select a desired song, a text data of the selected song is loaded into the RAM 13 from the hard disc unit 23 to thereby start the performance program. At first, Step S21 is undertaken to initialize every part of the Karaoke system such as both of a bar number variable SN and a repeat flag RF arc reset to "0". Then, Step S22 is undertaken to commence various regular processings such as automatic orchestra accompaniment. During the course of the accompaniment. Step S23 is undertaken to update the bar number variable SN everywhen the measure information containing the current bar number is read out from the RAM 13 and therefore each bar is detected. Next, Step S24 is undertaken to check as to if the repeat switch 28 is actuated. If the repeat switch 28 is actuated, the repeat flag RF is set to "1" in Step S25. On the other hand, if the repeat switch 28 is not actuated, the processing advances to Step S26 while the repeat flag RF is held "0". In Step S26, check is made as to if the addressed text data contains the measure information, i.e., as to if the accompaniment comes to a border between adjacent measures. If the border, i.e., the bar is detected, Step S27 is undertaken to check as to if the repeat flag RF is set, with "1". If RF="1" is held. Step S28 is executed to repeat the same measure from its start, address designated by the immediately preceding bar number SN-1 to thereby effect, the repeat operation. Then, the repeat flag RF is reset to "0". Thereafter, Step S29 is undertaken to check as to if the accompaniment comes to a last end. If the check result is held NO, the processing returns to Step S22 to continue the operation until the last, end of the accompaniment. On the other hand, when either check result of Steps S26 and S27 is held negative, the processing proceeds to Step S29. If the check result of Step S29 indicates the last end, the orchestra accompaniment is terminated.

Accordingly, in this second embodiment of the Karaoke apparatus, the repeat switch 28 is actuated to effect repeat. Karaoke performance involving not only the orchestra accompaniment but also the display of tile associated pictures, thereby realizing flexible and interesting Karaoke play. In modification, tile size of the repeat block may be set greater than one measure or one phrase. For example, the whole of the song may be divided into melodious blocks such as a chorus part, a refrain part, a verse part and a bridge part. By such manner, tile singer can freely alter or modify progression of a body part and an interposed part of the orchestra accompaniment.

Figure 8:
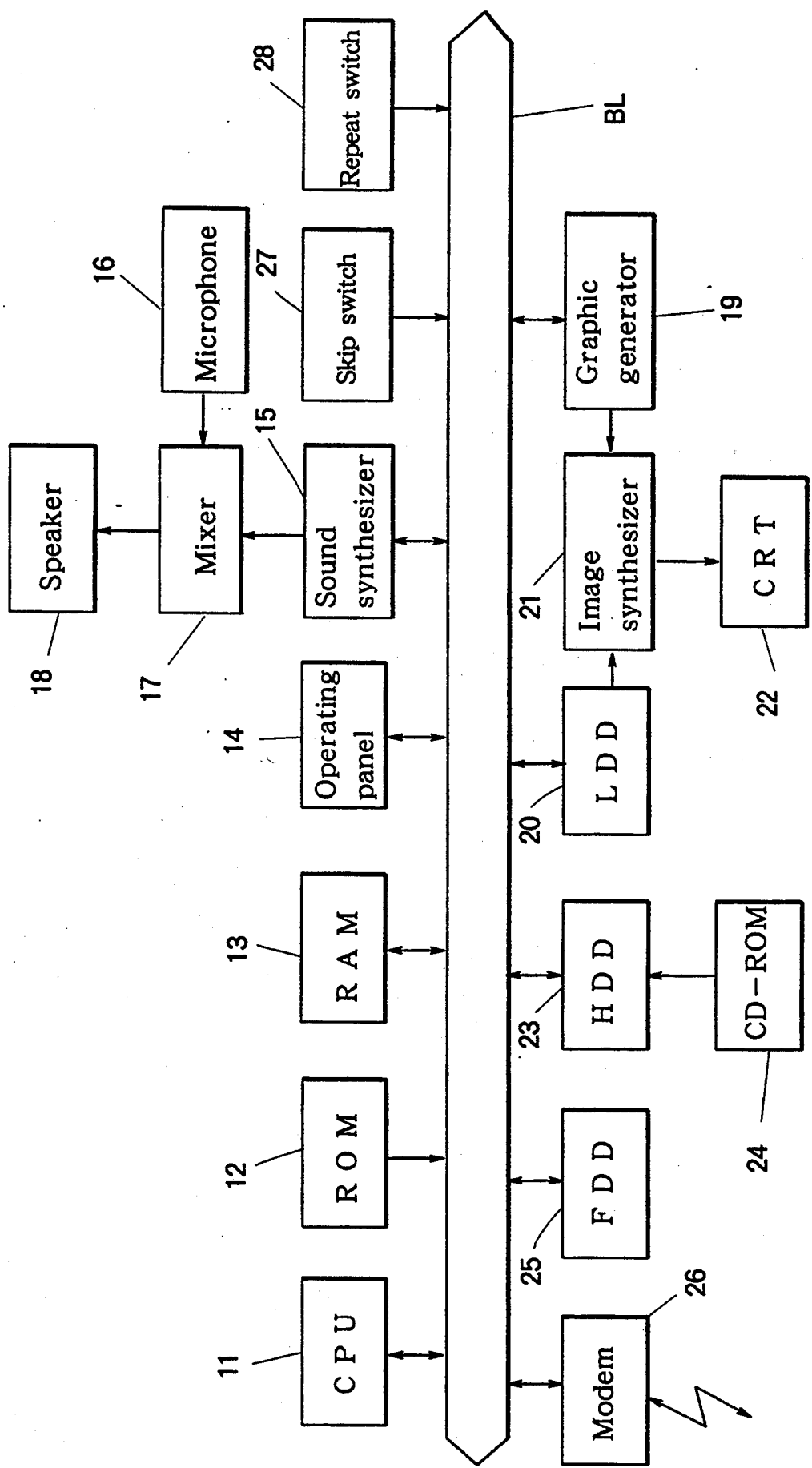
FIG. 8 is a schematic block diagram showing a third embodiment of the inventive Karaoke apparatus.

FIG. 8 schematically shows a third embodiment of the inventive Karaoke apparatus. In this embodiment, both of the skip and repeat operations are coupled with each other to enable more flexible and interesting Karaoke performance in contrast to either of tile first and second embodiments in which only one of the skip and repeat operations is executed. The Karaoke apparatus of FIG. 8 is different from the other Karaoke apparatus of FIG. 1 in that a repeat switch 28 similar to that of the FIG. 6 apparatus is provided in addition to a skip switch 27. In this case, the performance control program stored in a ROM 12 contains a specific program for the skip and repeat operations.

Figure 9:
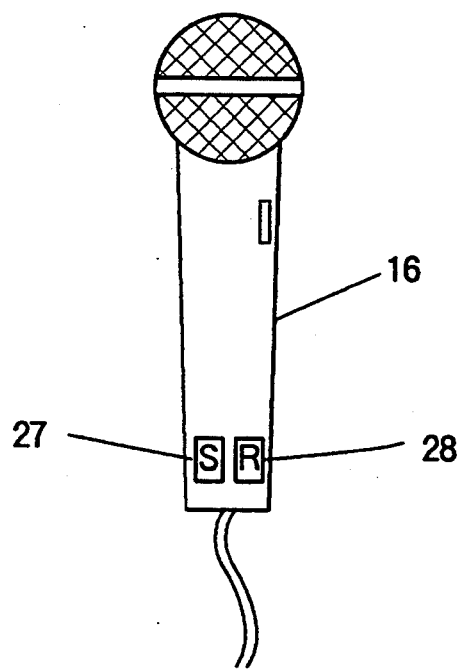
FIG. 9 is a side view of a microphone utilized in the third embodiment and provided with a pair of skip switch and repeat switch.

As shown in FIG. 9, both of the skip switch 27 and the repeat switch 28 are disposed on a grip of a microphone 16 for facilitating command operation by the singer during the song performance. When the skip switch 27 is actuated, the current block is terminated at the end thereof, and then the Karaoke accompaniment jumps to a second next block to continue the Karaoke accompaniment while skipping an immediately next block. In turn, when the repeat switch 28 is actuated, the Karaoke accompaniment does not advance to a next block after the current block is ended, but the Karaoke accompaniment returns to a start of the same block. Accordingly, in this third embodiment of the Karaoke apparatus, either of the skip switch 27 and the repeat switch 28 is actuated to effect skip and repeat Karaoke performance including the display of pictures associated to the orchestra accompaniment, thereby realizing flexible and interesting Karaoke song play. Further, these of the skip and repeat operations can be freely selected by the singer so as to joyfully arrange the progression of the orchestra accompaniment. By such a manner, irregular or unusual operation of the Karaoke apparatus can be realized according to a command by the singer likewise "My band".

Figure 10:
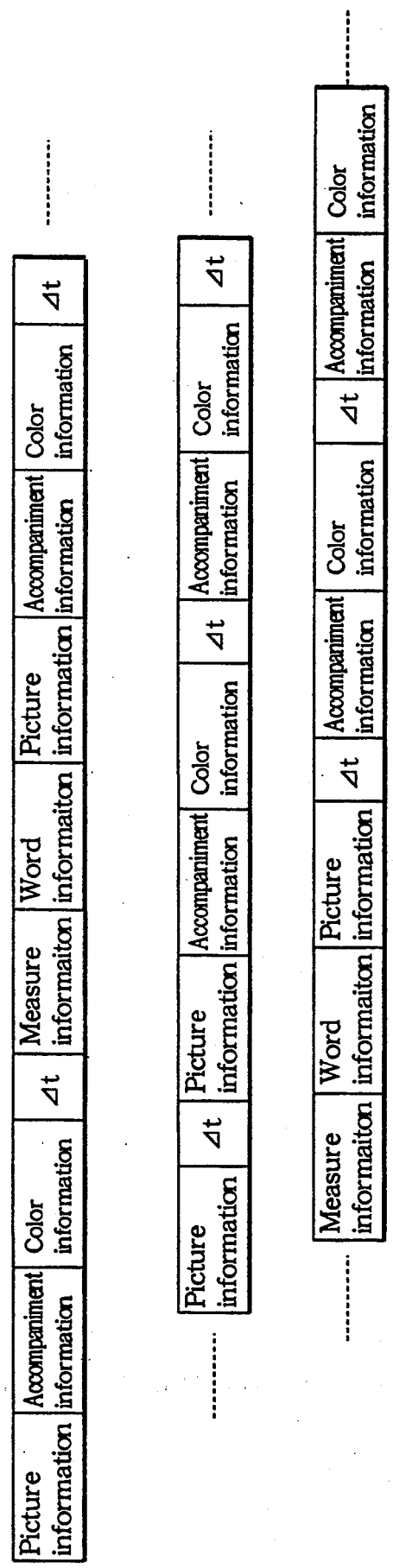
FIG. 10 is a format diagram illustrating another arrangement of performance data adopted in the inventive Karaoke apparatus.

FIG. 10 shows another format of the performance data adopted in the inventive Karaoke apparatus. In this format, the text data of the Karaoke song containing the accompaniment information, picture information and else is recorded in a single track in serial manner such that the accompaniment information and the corresponding picture information are linked together in the same section while the time interval information is commonly shared, thereby enabling synchronized performance operation with reduced data amount. This performance data is composed of each section containing at least one of measure information, word information, picture information, accompaniment information and color information. Every section is separated from each other by interposed time interval information $\Delta t$. In this serial format, each section is arranged such that all the events associated to the measure information, word information, picture information, accompaniment information and color information can occur concurrently.

In order to enrich the Karaoke performance, a play room of the Karaoke apparatus may be filled with a reverberation effect which simulates a famous concert hall or church. In such a modification, acoustic field information is registered in the same track as that of the accompaniment information or registered separately from the accompaniment information, together with the remaining word information and else. This acoustic field information contains acoustic field control parameters effective to operate an acoustic field controller provided in or around the Karaoke apparatus. Alternatively, the acoustic field information contains a select data for selecting desired acoustic field control parameters preset in the acoustic field controller. The acoustic field information is suitably arranged so as to realize a desired acoustic field in the play room to match with a mood of the performed Karaoke song to thereby enrich the Karaoke amusement. Such an acoustic field controller is disclosed in the U.S. Pat. No. 5,027,687. According to the invention, the acoustic field information is read out in synchronization with the accompaniment, information and the word information so as to control the acoustic field according to the selected song during the course of the Karaoke performance.

Occasionally, a singer may be unfamiliar with a requested song. In another modification, the Karaoke apparatus is constructed to enable such a singer to listen to a model singing of the requested song before or after the Karaoke performance. In order to reproduce a model singing, primary melody information is registered in the same track as that of the accompaniment information, or registered in a separate track on separate mediums such as Compact Disc or Laser Disc in linked manner to the accompaniment information, together with the remaining word information. The primary melody information represents a model singing which is reproduced in the form of a melodious sound or a human voice, clearly discriminative form the background accompaniment. The model singing is selectively reproduced by a command of the singer. The model singing operation can be efficiently combined to the skip or repeat operation according to the invention. For example, the singer listens to a part of the model singing, and then practices the song repeatedly after the model singing for lessen purpose. Otherwise, the singer practices the song, and then listens to the model singing for review. In the practicing, the accompaniment and, the song word are repeatedly reproduced while the model singing may be suspended by command. The repeat or skip operation may be effected for a desired block of the song for intensive practicing. After or before the practicing, the singer can sing the song concurrently with the reproduction of the model singing to master the correct melody.

What is claimed is:

1. A Karaoke apparatus comprising:

providing means for providing song data containing accompaniment information and word information when a desired song is requested;

sound means for reproducing an instrumental accompaniment of a requested song during the course of a vocal performance of the song by a singer;

display means for displaying words of the requested song according to the word information in parallel to reproduction of the instrumental accompaniment;

block means for provisionally dividing a whole of the song data into a plurality of blocks each having a start address and an end address;

detection means for successively detecting start and end addresses of each block with progression of the reproduction of the instrumental accompaniment and the display of the words;

skip command means for inputting a skip command when a certain block is being reproduced; and control means responsive to the detection means and the skip command means and operative when an end address of said certain block is detected for simultaneously controlling the sound means and the display means to skip an immediately succeeding block to thereby continue to a start address of a further succeeding block during the course of the reproduction of the instrumental accompaniment and the words corresponding to the instrumental accompaniment.

2. A Karaoke apparatus according to claim 1; wherein the sound means includes a microphone for picking up the vocal performance by the singer, and the skip command means comprises a skip switch provided on the microphone which is manually operable by the singer to input a skip command.

3. A Karaoke apparatus according to claim 1; wherein the block means includes means defining each block in terms of a chorus part, a verse part, a refrain part or a bridge part of the song.

4. A Karaoke apparatus according to claim 1; including register means for registering text data of the song containing accompaniment information and measure information in linked manner with each other, the accompaniment information is distributed to the sound means to enable the reproduction of the instrumental accompaniment, while the measure information is fed to the detection means to enable the detection of start and end addresses of each block.

5. A Karaoke apparatus comprising:

providing means for providing song data containing accompaniment information and word information when a desired gong is requested;

sound means for reproducing an instrumental accompaniment of a requested song during the course of a vocal performance of the song by a singer;

display means for displaying words of the requested song according to the word information in parallel to reproduction of the instrumental accompaniment;

block means for provisionally dividing a whole of the song data into a plurality of blocks each having a start address and an end address;

detection means for successively detecting start and end addresses of each block with progression of the reproduction of the instrumental accompaniment and the display of the words;

repeat command means for inputting a repeat command when a certain block is being reproduced; and control means responsive to the detection means and the repeat command means and operative when an end address of said certain block is detected for simultaneously controlling the sound means and the display means to return to a start address of said certain block to thereby repeat said certain block during the course of the reproduction of the instrumental accompaniment and the words corresponding to the instrumental accompaniment.

6. A Karaoke apparatus according to claim 5; wherein the sound means includes a microphone for picking up the vocal performance by the singer, and the repeat command means comprises a repeat switch provided on the microphone which is manually operable by the singer to input a repeat command.

7. A Karaoke apparatus according to claim 5; wherein the block means includes means defining each block in terms of a measure or a phrase of the song.

8. A Karaoke apparatus according to claim 5; including register means for registering text data of the song containing accompaniment information and measure information in linked manner with each other, the accompaniment information is distributed to the sound means to enable the reproduction of the instrumental accompaniment, while the measure information is fed to the detection means to enable the detection of start and end addresses of each block.

9. A Karaoke apparatus comprising:

providing means for providing song data containing accompaniment information and word information when a desired song is requested;

sound means for reproducing an instrumental accompaniment of the requested song according to the accompaniment information during the course of a vocal performance of the song;

display means for displaying words of the requested song according to the word information in parallel to reproduction of the instrumental accompaniment;

block means for provisionally dividing a whole of the song data into a plurality of blocks;

detection means for detecting each block which is successively provided during the progression of the reproduction of the instrumental accompaniment and the display of the words;

skip command means for inputting a skip command effective to specify a particular block to be skipped; and control means operative when the detection means detects the particular block for simultaneously controlling the sound means and the display means to skip the particular block such that the sound means jumps a part of the instrumental accompaniment corresponding to the particular block and the display means jumps a part of the words corresponding to the same particular block.

10. A Karaoke apparatus according to claim 9, wherein the sound means includes a microphone for picking up the vocal performance by the singer, and the skip command means comprises a skip switch provided on the microphone which is manually operable by the singer to input a skip command.

11. A Karaoke apparatus according to claim 9, wherein the block means includes means defining each block in terms of a chorus part, a verse part, a refrain part or a bridge part of the song.

12. A Karaoke apparatus according to claim 9, including register means for registering text data of the song containing accompaniment information and measure information in linked manner with each other, the accompaniment information is distributed to the sound means to enable the reproduction of the instrumental accompaniment, while the measure information is fed to the detection means to enable the detection of start and end addresses of each block.

* * * * *